United States Patent Office 2,800,592
Patented July 23, 1957

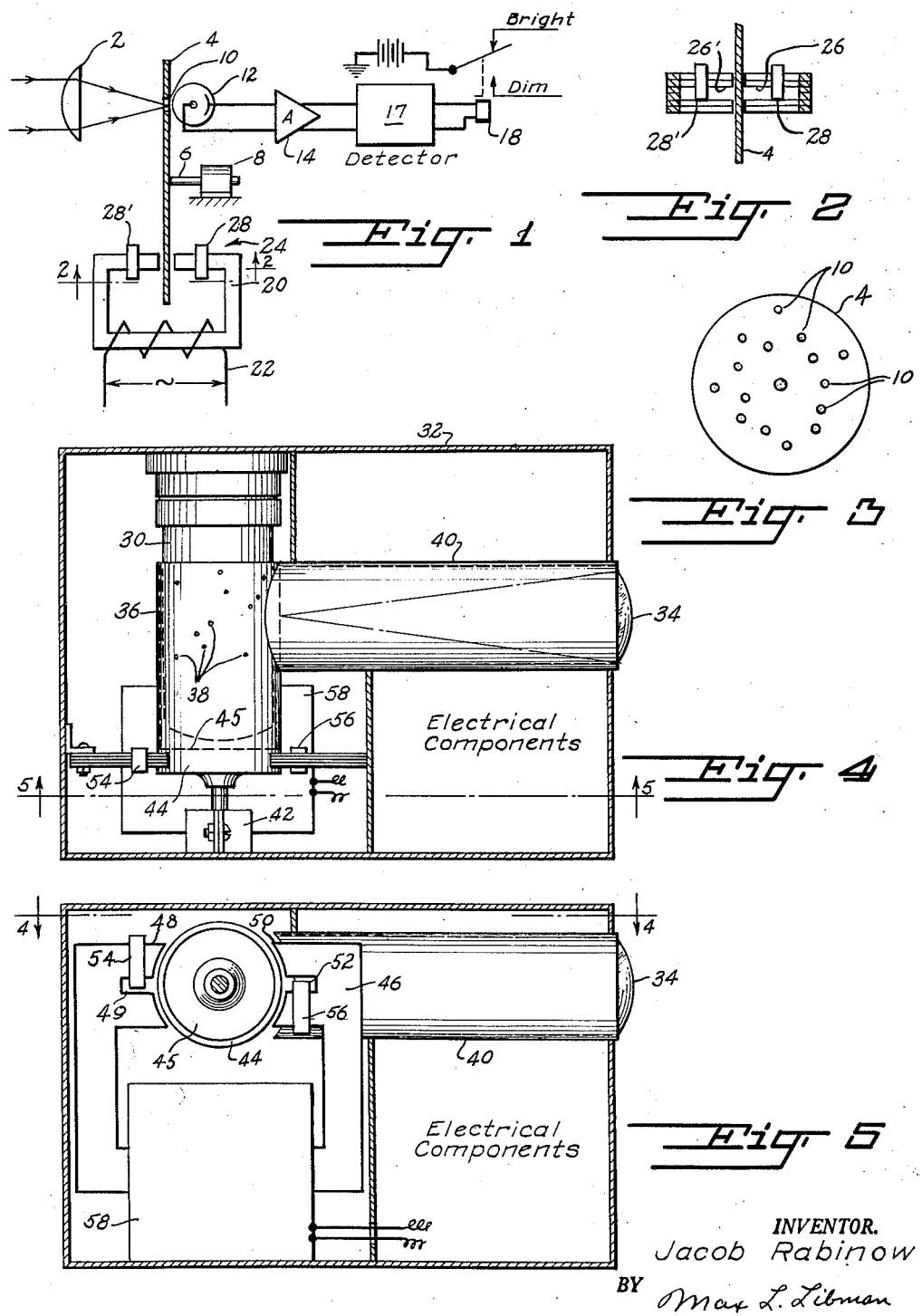

2,800,592
ROTARY SCANNER

Jacob Rabinow, Takoma Park, Md.

Application February 12, 1954, Serial No. 409,901

3 Claims. (Cl. 250—233)

This invention relates to a direct electrical drive for rotary mechanical scanning devices such, for example, as a Nipkow disc, and has for its primary object the provision of a rotary scanning device which is electrically driven without requiring separate electric or other motor.

My copending application, Serial No. 385,942, filed October 14, 1953, for "Automatic Headlight Dimmer With Anti-Oscillation Circuit" discloses an automatic headlight dimmer of the scanning type and shows two different forms of mechanical scanners, both driven by separate electric motors. It is a primary object of the invention to eliminate this separate electric motor drive with resulting economy of manufacture and maintenance, and greater compactness.

More specifically, it is an object of the invention to provide a motor drive for rotary scanning element which uses the rotary element itself as the rotor of an electric motor and drives the rotary element by direct action of the electric field thereon.

The specific nature of the invention, as well as other objects and advantages thereof, will clearly appear from a description of a preferred embodiment as shown in the accompanying drawing, in which:

Fig. 1 is a schematic diagram showing one form of the invention, using a scanning disc;

Fig. 2 is a sectional view taken on line 2—2 of Fig. 1;

Fig. 3 is a side elevation of the Nipkow disc of Fig. 1;

Fig. 4 is a sectional view taken on line 4—4 of Fig. 5 showing a modified form of the invention using a scanning drum instead of a disc; and Fig. 5 is a sectional view taken on line 5—5 of Fig. 4.

Fig. 1 shows the invention applied to a scanning disc dimmer of the Nipkow type, similar to that shown in Fig. 1 of application Serial No. 385,942, previously referred to, the principle of which will be briefly recapitulated. The invention is intended to be mounted on a vehicle such as an automobile in such fashion that light from the field of view ahead of the vehicle is collected by lens 2 or any other optical system, and focussed in the plane of disc 4 which is rotated at a suitable speed (e. g., 10 R. P. S.) on its central shaft 6 in any suitable bearing 8. Disc 4 is provided with a number of apertures 10 which may be arranged in the conventional spiral path, this being the well-known Nipkow disc construction used in early television, or may be arranged in random order, as shown at 10 in Fig. 3, whereby the series of apertures continually sweeps and scans the entire image formed by lens 2.

The random order of the apertures shown in Fig. 3 is such as would be produced by taking each aperture position of a spiral array and moving it on the same radius to a different position, so that considering each aperture as sweeping a single line across the image, the sum total of lines swept during a single revolution of the disc will still cover the entire image, it being understood that the "lines" have a finite width (corresponding to the spot diameter) such that each line touches or slightly overlaps the adjacent lines on both sides, whereby the entire area of the picture is scanned. This random distribution of the holes therefore produces a random sequence of the "lines" during each revolution of the disc. The purpose of this will now be explained.

If the holes are arranged in a spiral, as shown in my previous application, above referred to, then two bright lights, such as the headlights of a car, which are close together, will be picked up by two apertures closely spaced in time, so that the two resultant pulses in the circuit will be very close together and will appear to the relay as one pulse; then the next double pulse will appear on the next revolution of the disc. With the random spacing, on the average, the two pulses will not come close together, but will be spaced an average distance of one-half revolution apart. Relay 18 is held down in the "dim" position by a series of pulses produced by the light from a headlight or other light in the field of view shining through a particular aperture once for each revolution of the disc. Normally the disc will be run at such speed that this pulse frequency is high enough so that the relay does not chatter. If the number of pulses for each revolution can be doubled, the relay will obviously have still less tendency to chatter. With random spacing, the number of pulses from closely spaced headlights will, on the average, obviously be increased, so that this distribution of apertures is therefore preferable, as it will have a tendency to produce a higher frequency of pulses. Since the headlights of a car are in a horizontal line, the disc should be so oriented that the scanning lines are vertical, to take advantage of the random distribution, but even if the scanning lines are horizontal there will be an improvement in frequency of pulses in the case where two different cars are in the field of view at a great distance and are not on the same horizontal line, as is often the case. Instead of a random order being used, obviously the apertures can be arranged in angular groups so that every alternate (or third, etc.) aperture is in a different group to insure that pulses from closely-spaced lights are not closely spaced in time.

The amount of background light ordinarily passed by an aperture is insufficient to actuate the dimmer, but when the image of a bright light such as a headlight is scanned by an aperture, the intensity is sufficient to actuate the photocell 12 (which in practice is preferably a photomultiplier tube) which through amplifier 14 and detector 17 energizes relay 18 to dim the headlights of the vehicle. Where there is no longer a bright light in the field of view, the system is deenergized and the relay released to its original position wherein the headlights are bright.

In my prior application, the scanning disc is shown driven by a separate motor. As shown in Fig. 1, in the present application I eliminate this separate motor by providing a shaded-pole magnetic field member 20, having a winding 22, driven from any suitable alternating current source which may be provided by the vibrator power supply normally required for the electronic components of the amplifier and detector circuit. Magnetic field member 20 is provided with the well known shaded-pole construction indicated at 24. The ends of the pole are slotted as shown at 26 and 26', and solid copper rings 28 and 28' placed in the slot so as to provide the customary short circuited shading coil which produces an out-of-phase field component which causes the disc to rotate. The disc is made of nonmagnetic metal such as aluminum or brass.

As there is no load on the scanning disc, the force required is only sufficient to cause the disc to rotate at an adequate speed. A minimum speed in the order of 10 R. P. S. is required to prevent relay 18 from chattering when it is energized by an oncoming headlight. It will be apparent that this very moderate requirement can easily be met with a circuit of very small physical size and negligible power requirement.

Figs. 4 and 5 show a modification similar to that of Fig. 2 of my previously referred to application. The circuitry is the same as shown in Fig. 1, but the photosensitive element is specifically shown as a photomultiplier tube 30 mounted in housing 32, the front of which supports lens 34 which focusses the desired image on the surface of rotary drum 36, which is provided with a series of apertures 38 helically arrayed or preferably in random order so that on each revolution of drum 36 the entire surface of the image is serially swept by the apertures 38 to scan the image. An opaque tube 40 is shown, serving as a light-shield to prevent any stray light from electrical components such as vacuum tubes from affecting the operation of the system.

Scanning drum 36 is mounted on bearing 42 for rotation about its central longitudinal axis. Although the tube is preferably made of a light metallic material such as aluminum, in the base 44 there is preferably a core 45 made of magnetic material. Magnetic field member 46 is provided with pole faces 48 and 50 closely spaced from the cylindrical surface of base 44 to provide the usual minimum air gap. The pole faces are slotted as shown at 49 and 52 respectively and provided with copper shading coils 54 and 56, so that when alternating current is applied to winding 58, drum 36 is caused to rotate. Thus, instead of providing a separate motor for the drum, a portion of the drum is used as the motor armature and a simplified, highly compact, and economical structure is achieved. The casing 32 is shown of such size that it can also house the electrical circuit components, whereby the entire headlight dimmer is supplied in a compact unitary package.

It will be apparent that the embodiments shown are only exemplary and that various modifications can be made in construction and arrangement within the scope of my invention as defined in the appended claims.

I claim:

1. For use in an automatic headlight dimmer, a rotary mechanical scanning system comprising an optical system having a focal plane, for producing an image of a field of view, a thin conductive rotary scanning member so arranged that at least a portion of its area lies substantially in the focal plane of said optical system, a series of apertures in said portion of the thin member, said apertures being so disposed as to successively sweep across and scan said entire image as the member is rotated, a photosensitive element on the opposite side of said scanning member from said optical system and disposed as to receive light from said image only through said apertures, and means for producing a torque directly in said rotary member to cause rotation thereof, said last means comprising magnetic field winding means having poles with pole faces adjacent surface portions of said rotary means, and energizing member for said magnetic field means, said poles having shading coils so disposed that alternating current energization of said winding means will produce a torque on said rotary scanning member, said scanning member being a cup-shaped member having thin walls, said photosensitive device extending into and substantially filling the interior of said cup-shaped member from the open end thereof, the closed end of said cup-shaped member being a relatively thick disc of magnetic material and said pole faces being adjacent the cylindrical surface of said disc.

2. The invention according to claim 1, said apertures having a random distribution.

3. A rotary mechanical scanning device comprising an optical system for producing an image of a field of view, a thin rotary scanning member of substantial area defining a substantially opaque surface at least a portion of which lies substantially in the focal plane of said optical system and having at least one transparent area so disposed as to sweep across and scan said image as the member is rotated, said rotary scanning member being a cup-shaped drum member open at one end, a photosensitive element extending into the interior of said drum member from the open end thereof, and oriented to receive light from said image through said transparent area, the closed end of said cup-shaped member being a relatively thick disc of magnetic material, and means for producing a magnetic field acting directly on said thick disc to produce rotation of said drum, said last means comprising a magnetic field winding means having poles with pole faces adjacent surface portions of said thick disc, said poles having shading coils so disposed that alternating current energization of said winding means will produce a torque on said drum.

References Cited in the file of this patent

UNITED STATES PATENTS

| | | |
|---|---|---|
| 1,631,021 | Dowling | May 31, 1927 |
| 2,102,145 | Fallou | Dec. 14, 1937 |
| 2,278,485 | Potts | Apr. 7, 1942 |
| 2,458,334 | Brosius, Jr. | Jan. 4, 1949 |
| 2,576,760 | Jones et al. | Nov. 27, 1951 |
| 2,632,040 | Rabinow | Mar. 17, 1953 |